United States Patent
Reddy et al.

(10) Patent No.: US 12,552,485 B2
(45) Date of Patent: Feb. 17, 2026

(54) COOLING OF HEAT-GENERATING COMPONENTS IN ELECTRIC VEHICLES

(71) Applicant: TVS MOTOR COMPANY LIMITED, Chennai (IN)

(72) Inventors: Poreddy Kambi Reddy, Chennai (IN); Lohit Vishwanath Patil, Chennai (IN); Kiran Kulkarni, Chennai (IN); Dharmaraj Krishnaprasath, Chennai (IN); Sulaiman Thariq Ahmad, Chennai (IN); Syam Sasidharan, Chennai (IN); Naraharisetti Ramakrishna, Chennai (IN); Manish Garg, Chennai (IN); Ramanathan Ananthanarayanan, Chennai (IN); Komban Paulson Abel, Chennai (IN); Balaguru Sridhar, Chennai (IN)

(73) Assignee: TVS Motor Company Limited, Chennai (IN)

( * ) Notice: Subject to any disclaimer, the term of this patent is extended or adjusted under 35 U.S.C. 154(b) by 727 days.

(21) Appl. No.: 17/910,584

(22) PCT Filed: Mar. 9, 2021

(86) PCT No.: PCT/IB2021/051928
§ 371 (c)(1),
(2) Date: Sep. 9, 2022

(87) PCT Pub. No.: WO2021/181251
PCT Pub. Date: Sep. 16, 2021

(65) Prior Publication Data
US 2023/0137173 A1 May 4, 2023

(30) Foreign Application Priority Data
Mar. 11, 2020 (IN) .............................. 202041010486

(51) Int. Cl.
*B62J 50/30* (2020.01)
*B60L 50/60* (2019.01)
(Continued)

(52) U.S. Cl.
CPC ............... *B62J 50/30* (2020.02); *B60L 50/66* (2019.02); *B62J 15/00* (2013.01); *B62J 43/16* (2020.02);
(Continued)

(58) Field of Classification Search
CPC B62J 50/30; B62J 43/16; B62J 43/20; H01M 10/613; H01M 10/625;
(Continued)

(56) References Cited

U.S. PATENT DOCUMENTS 5,477,936 A * 12/1995 Sugioka ................... B62J 43/28
180/68.5
9,543,598 B2 * 1/2017 Otsuka .............. H01M 8/04201
(Continued)

FOREIGN PATENT DOCUMENTS

EP 0648632 A2 * 4/1995 ............. B60K 11/06
EP 2799322 A1 * 11/2014 ............. B60L 50/51
(Continued)

OTHER PUBLICATIONS

EP-2799322-A1 English Translation (Year: 2014).*
(Continued)

*Primary Examiner* — Michael T. Walsh
(74) *Attorney, Agent, or Firm* — Osha Bergman Watanabe & Burton LLP

(57) ABSTRACT

An electric Vehicle (EV) includes a frame extending rearwards from the front portion of the EV towards a rear portion of the EV. A floorboard structure is disposed below the frame and is supported by the frame. A battery is disposed in a cavity defined between the floorboard structure and the
(Continued)

frame. A first heat-generating component is disposed in the rear portion of the EV. The EV includes a duct extending from the front portion to the first heat-generating component to conduct air from the front portion to the first heat-generating component. A second heat-generating component is disposed in the cavity. The duct includes: an inlet facing the front portion to receive air from the front portion; a first outlet facing the first heat-generating component to supply air to the first heat-generating component; and a second outlet facing the second heat-generating component to supply air to the second heat-generating component.

14 Claims, 12 Drawing Sheets

(51) Int. Cl.
*B62J 15/00* (2006.01)
*B62J 43/16* (2020.01)
*H01M 10/613* (2014.01)
*H01M 10/625* (2014.01)
*H01M 10/6563* (2014.01)

(52) U.S. Cl.
CPC ....... *H01M 10/613* (2015.04); *H01M 10/625* (2015.04); *H01M 10/6563* (2015.04); *B60L 2200/12* (2013.01); *B60L 2240/36* (2013.01); *H01M 2220/20* (2013.01)

(58) Field of Classification Search
CPC .......... H01M 10/6563; H01M 2220/20; B60L 2200/12; B60L 2240/36; B60L 2240/425; B60L 2240/525; B60L 1/02; B60K 2001/003; B60K 2001/006; B60K 1/00; B60K 11/06; B60Y 2200/12; Y02E 60/10; Y02T 10/64; Y02T 10/70; B62K 2204/00
See application file for complete search history.

(56) References Cited

U.S. PATENT DOCUMENTS

| 12,286,188 B2* | 4/2025 | Ueno ................. B62J 50/30 |
| 2013/0122338 A1* | 5/2013 | Katayama ........... H01M 10/613 429/83 |
| 2013/0256049 A1* | 10/2013 | Matsuda ................. B62J 43/16 180/220 |
| 2013/0270940 A1 | 10/2013 | Matsuda |
| 2015/0314830 A1* | 11/2015 | Inoue ................. B62J 43/16 180/220 |

FOREIGN PATENT DOCUMENTS

| JP | 2009004319 A | * | 1/2009 | |
| JP | 2012091689 A | * | 5/2012 | ............. B62K 11/10 |
| WO | WO-2019186946 A1 | * | 10/2019 | ............. B62K 11/04 |

OTHER PUBLICATIONS

EP-0648632-A2 English Translation (Year: 1995).*
WO-2019186946-A1 English Translation (Year: 2019).*
JP-2012091689-A English Translation (Year: 2012).*
JP-2009004319-A English Translation (Year: 2009).*
International Search Report issued in corresponding International Application No. PCT/IB2021/051928 mailed Jun. 17, 2021 (4 pages).
Written Opinion issued in corresponding International Application No. PCT/IB2021/051928 mailed Jun. 17, 2021 (7 pages).

* cited by examiner

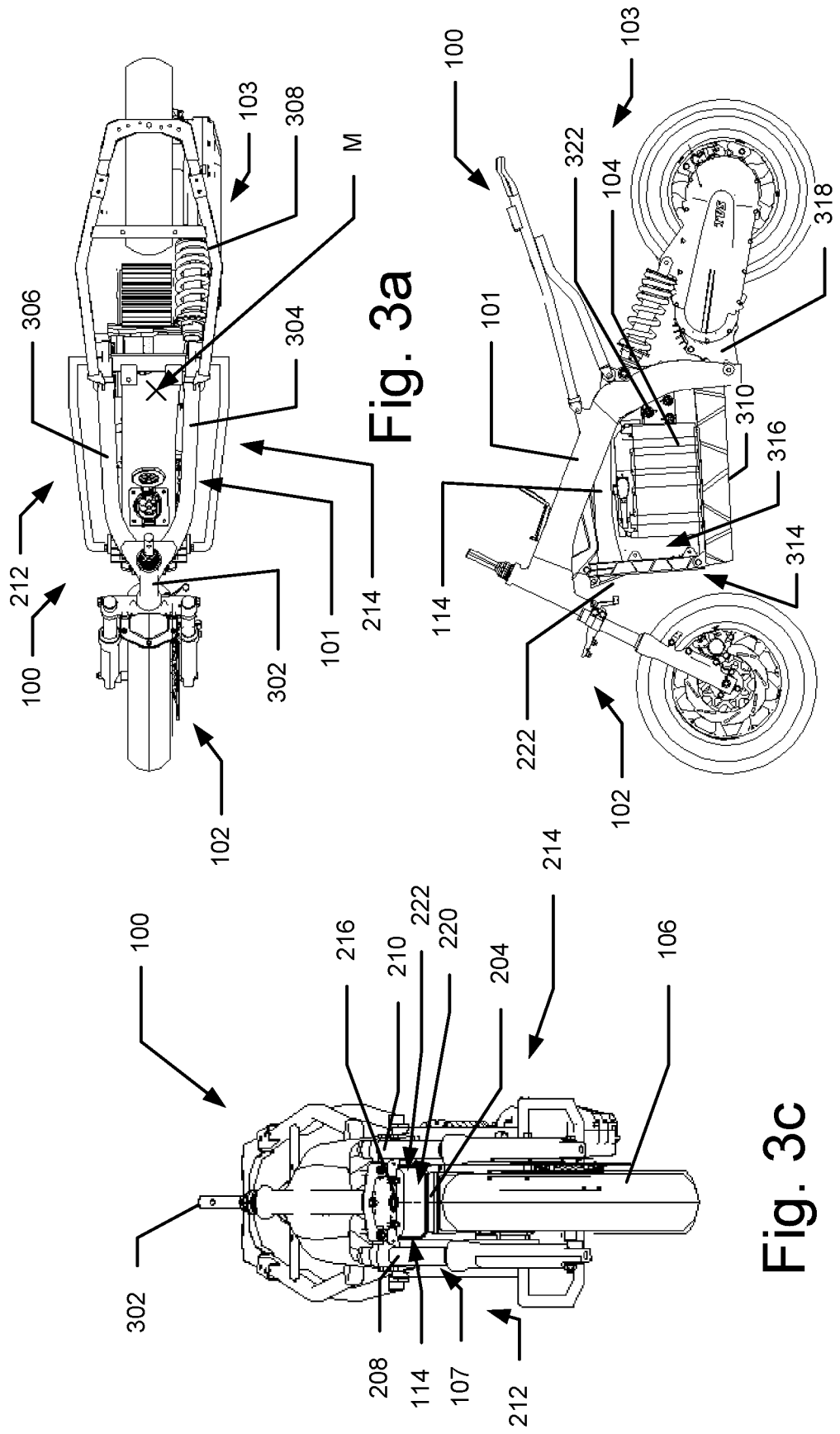

COOLING OF HEAT-GENERATING COMPONENTS IN ELECTRIC VEHICLES

FIELD OF INVENTION

The present subject matter relates to cooling of heat-generating components in vehicles, such as electric vehicles (EVs).

BACKGROUND

Vehicles, such as electric vehicles (EVs), include heat-generating components, such as an electric motor, a controller, and the like. The heat-generating components generate heat during operation of the EV.

BRIEF DESCRIPTION OF DRAWINGS

The detailed description is provided with reference to the accompanying figures. In the figures, the left-most digit(s) of a reference number identifies the figure in which the reference number first appears. The same numbers are used throughout the drawings to reference like features and components.

FIG. 3a illustrates a top view of an EV, in accordance with an implementation of the present subject matter;

FIG. 3b illustrates a right-side view of an EV, in accordance with an implementation of the present subject matter;

FIG. 3c illustrates a front view of an EV, in accordance with an implementation of the present subject matter;

DETAILED DESCRIPTION

Figure 1:
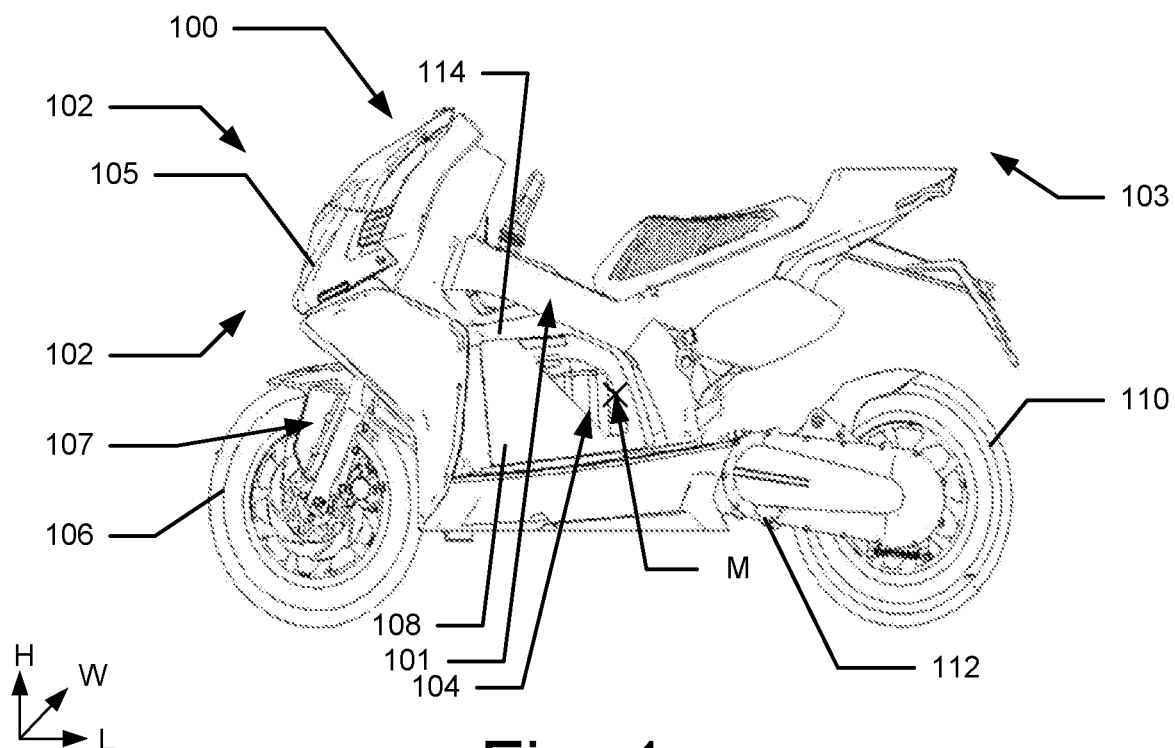
FIG. 1 illustrates a right-side view of an electric vehicle (EV), in accordance with an implementation of the present subject matter.

Heat-generating components, such as an electric motor, a controller, and the like, generate heat during operation of the EV. To cool the heat-generating components to prevent over-heating of the heat-generating components, the generated heat may have to be transferred away from the components. However, taking the heat away from such heat-generating components may be an energy-consuming process and may affect the performance of the EV. For instance, cooling components, such as cooling fans, may be implemented in the EV to take the heat away. The cooling components may increase an electric load on the electric motor of the EV, which increases power consumption of the EV. As a result, the efficiency of the EV may be decreased. Furthermore, noise produced by the cooling fans may reduce driving experience to a user of the EV.

The present subject matter relates to cooling of heat-generating components in Electric vehicles (EV). With the implementations of the present subject matter, the heat-generating components in the EV may be cooled easily and efficiently.

In accordance with an example implementation, an electric vehicle (EV) may comprise a frame, and a floorboard structure. The frame may extend rearwards from a front portion of the EV towards a rear portion of the EV. The floorboard structure may be disposed below the frame and may be supported by the frame. In an example, the floorboard structure may be coupled to the frame through a floorboard mount. Further, a cavity may be defined between the floorboard structure and the frame. A battery of the EV may be disposed in the cavity.

The EV may include a first heat-generating component disposed in the rear portion of the EV. The first heat-generating component may be, for example, an electric motor. To cool the first heat-generating component, the EV may comprise a duct extending rearwards from the front portion towards the first heat-generating component.

A portion of the duct may be disposed above the battery as the duct extends rearwards. The air flowing in the front portion of the EV may enter the duct and the duct may conduct the air to the first heat-generating component. The air conducted by the duct may flow over the first heat-generating component to facilitate cooling of the first heat-generating component.

The present subject matter enables easy and efficient cooling of the heat-generating components, such as an electric motor, a controller, and the like, in the EV. Further, since the present subject matter utilizes air flowing in the front portion of the EV to cool the heat-generating components, the present subject matter may prevent the utilization of additional cooling components, such as cooling fans. Accordingly, the present subject matter saves energy, which in turn results in enhanced performance of the EV. By preventing the utilization of cooling components, the present subject matter also prevents noise generated by the cooling components.

The present subject matter is further described with reference to FIGS. 1-15. It should be noted that the description and figures merely illustrate principles of the present subject matter. Various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

Some of the terms, which are used in the following description and their meanings are explained below:

Front direction refers to a direction from a rear wheel of an EV towards a front wheel. Rear direction refers to a direction from the front wheel of an EV towards the rear wheel. The front direction and the rear direction may be referred to as the length direction as the EV extends in length in front direction and the rear direction. Midpoint (M) of the EV refers to a midpoint along the length direction, the breadth direction and the width direction of the EV. Front portion refers to a front half of a vehicle along the length direction. Rear portion refers to a rear half of a vehicle along the length direction of the EV. Left-hand side refers to left-hand side direction of the EV when the EV is being viewed from the front of the EV. Right-hand side refers to a right-hand side direction of the EV when the EV is being viewed from the front of the EV.

FIG. 1 illustrates a right-side view of an electric vehicle (EV) 100, in accordance with an implementation of the present subject matter. The EV 100 may include a frame 101 to facilitate coupling of components of the EV 100 and to support components of the EV 100. For instance, the frame 101 may provide structural support to components of the EV 100 to endure loads acting on the EV 100, such as weight of a rider (not shown in FIG. 1), force due to side wind, and the like. In an example, the frame 101 may extend from the front portion 102 of the EV 100 towards the rear portion 103 of the EV 100.

The EV 100 may include a battery 104 to drive the EV 100. Further, the EV 100 may include a heat-generating component, such as a first heat-generating component. The first heat-generating component may be, for example, an electric motor (not shown in FIG. 1), which may receive power from the battery 104 of the EV 100 to propel the EV 100. Hereinafter, the first heat-generating component may be explained with reference to the electric motor. During operation, the electric motor may generate heat. For instance, as the electric motor runs to propel the EV 100, the electric motor may generate heat.

The EV 100 may include a front panel 105, a front wheel 106, a front wheel suspension assembly 107, and a side panel 108 in the front portion 102. The EV 100 may include a rear wheel 110 and a transmission system 112 in the rear portion 103.

In an example, the side panel 108 may serve the purpose of protecting the heat-generating components from structural damages caused to the heat-generating components and improve aesthetics of the EV 100. Further, the side panel 108 may prevent direct exposure to air to the heat-generating component, which may cause over-heating of the heat-generating components.

To prevent heating of the heat-generating component, the EV 100 may include a duct 114. The duct 114 may conduct air to the heat-generating components to prevent over-heating of the heat-generating components. In an example, the duct 114 may conduct air from the front portion 102 of the EV 100 to the heat-generating components. In an example, the duct 114 may be a load-bearing member. For instance, the duct 114 may be a part of the frame 101 and a portion of load acting on the frame 101 may act on the duct 114.

Figure 2:
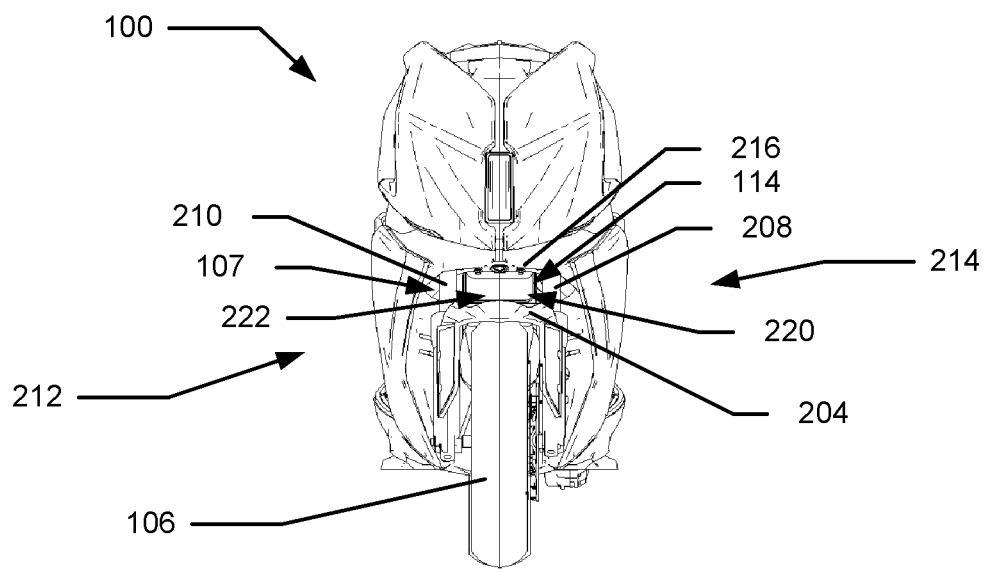
FIG. 2 illustrates a front view of an EV, in accordance with an implementation of the present subject matter.

FIG. 2 illustrates a front view of the EV 100, in accordance with an implementation of the present subject matter. The EV 100 may include a front wheel fender 204 at the front portion 102 of the EV 100, which may be disposed above the front wheel 106. The front wheel fender 204 may be, for example, curved or flat-shaped. Further, the front wheel suspension assembly 107 may include a first fork 208 and a second fork 210. The first fork 208 may be on the left-hand side 212 and the second fork 210 may be on the right-hand side 214. The front wheel suspension assembly 107 may further include a suspension bracket 216 (referred to as "lower suspension bracket"), which may couple the first fork 208 and the second fork 210. The lower suspension bracket 216 may be disposed above the front wheel fender 204 such that a gap 220 is defined between the lower suspension bracket 216 and the front wheel fender 204. The lower suspension bracket 216 may be, for example, flat-shaped or curved relative to the gap 220.

To conduct the air from the front portion 102 of the EV 100 to the electric motor (not shown in FIG. 2), an inlet 222 of the duct 114 may face the front portion 102 of the EV 100. In an example, the inlet 222 may face the gap 220 to receive air from above the front wheel fender 204.

FIG. 3a illustrates a top view of the EV 100, in accordance with an implementation of the present subject matter. The frame 101, which may extend rearwards from the front portion 102 of the EV 100 towards the rear portion 103 of the EV 100, is depicted herein.

In an example, the frame 101 may be coupled to a head pipe 302. The head pipe 302 may be, for example, positioned at the front portion 102 to facilitate steering of the EV 100. The frame 101 may extend rearwards from the head pipe 302 towards the rear portion 103 of the EV 100.

In an example, the frame 101 may include a first frame member 304 and a second frame member 306. The first frame member 304 may extend along the right-hand side 214 from the head pipe 302 towards the rear portion 103. The second frame member 306 may extend along the left-hand side 212 from the head pipe 302 towards the rear portion 103. The frame 101 may include a third frame member 308 coupled to and extending rearwards from the first frame member 304 and the second frame member 306. The third frame member 308 may have substantially U-shaped structure and may be coupled to a seat (not shown in FIG. 3a) for supporting the seat. The frame 101 may be, for example, a perimeter frame, a monocoque frame, a trellis frame, or a cradle frame. In an example, the first frame member 304, the second frame member 306, and the third frame member 308 may be a hollow rod or a solid rod.

FIG. 3b illustrates a right-side view of the EV 100, in accordance with an implementation of the present subject matter.

The EV 100 may include a floorboard structure 310 disposed below the frame 101 and supported by the frame 101. The floorboard structure 310 may be disposed rearwards of the front wheel 106. Further, the floorboard structure 310 may be substantially horizontal in shape and may be supported by the frame 101. For supporting, the floorboard structure 310 may be coupled to the frame 101 through a floorboard mount 312, which may be substantially vertical. In an example, the floorboard mount 312 may be coupled to the floorboard structure 310 at a front end 314 of the floorboard structure 310.

Further, the floorboard structure 310 may act as a floor onto which components of the EV 100, such as the battery 104, may be mounted. In an example, the battery 104 may be disposed in a cavity 316 defined between the floorboard structure 310 and the frame 101.

The electric motor 318 may be disposed rearwards of the floorboard structure 310 and may receive electric power from the battery 104 to propel the EV 100. In an example, the whole electric motor 318 may lie in the rear portion 103 and may be coupled to the frame 101 at the rear portion 103. In another example, a part of the electric motor 318 may be disposed in the front portion 102 and remaining part of the electric motor 318 may be disposed in the rear portion 103. In a further example, the whole electric motor 318 may lie in the front portion 102.

The duct 114 may extend from the front portion 102 towards the electric motor 318 to conduct air from the front portion 102 to the electric motor 318. As a result, air from the front portion 102 may be supplied to the electric motor 318, which may cool the electric motor 318. In an example, the inlet 222 of the duct 114 may be positioned above the front wheel fender 204 (not shown in FIG. 3b) to receive air from the front portion 102. Further, as the duct 114 may extend from the front portion 102 towards the electric motor 318, a portion of the duct 114 may be disposed above the battery 104, such that interference with the battery 104 is avoided.

The EV 100 may include a second heat-generating component disposed in the cavity 316. The second heat-generating component may be, for example, a controller 322 that may control operation of the electric motor 318. Hereinafter, the second heat-generating component may be explained with reference to the controller 322. The controller 322 may be disposed in the cavity 316 adjacent to the battery 104.

FIG. 3c illustrates a front view of the EV 100, in accordance with an implementation of the present subject matter.

The first fork 208 may be coupled to the head pipe 302 and may extend downwards towards the front wheel 106 on the left-hand side 212. The second fork 210 may be coupled to the head pipe 302 and may extend downwards towards the front wheel 106 on the right-hand side 214.

The front wheel 106 may be disposed below the head pipe 302 and may be coupled to the first fork 208 and to the second fork 210. For instance, each of the first fork 208, the second fork 210 may have a top end (not shown in FIG. 3c) and a bottom end (not shown in FIG. 3c). The top end of the first fork 208 and the second fork 210 may be coupled to the head pipe 302 and the bottom end of the first fork 208 and the second fork 210 may be coupled to the front wheel 106.

In an example, the front wheel fender 204 may be disposed above the front wheel 106 and below the suspension bracket 216. Further, the front wheel fender 204 may extend along a part of the front wheel 106 above the front wheel 106 and extend between the first fork 208 and the second fork 210.

As mentioned earlier, the inlet 222 of the duct 114 may face the gap 220 to receive air from the front portion 102. In an example, the inlet 222 may have a sufficiently large width and height to ensure that a considerable amount of air enter the duct 114 to be supplied to the heat-generating components for their cooling. Accordingly, the height and the width of the inlet 222 may be selected based on the size of the heat-generating components and the amount of heat that is generated by the heat-generating components. Also, the dimensions of the inlet 222 of the duct 114, such as the width and the height, may be dependent on a distance between the first fork 208 and the second fork 210, and a distance between the lower suspension bracket 216 and the front wheel fender 204. For instance, the width of the inlet 222 may be dependent on the distance between the first fork 208 and the second fork 210, and the height of the inlet 222 may be dependent on the distance between the lower suspension bracket 216 and the front wheel fender 204.

Figure 4A:
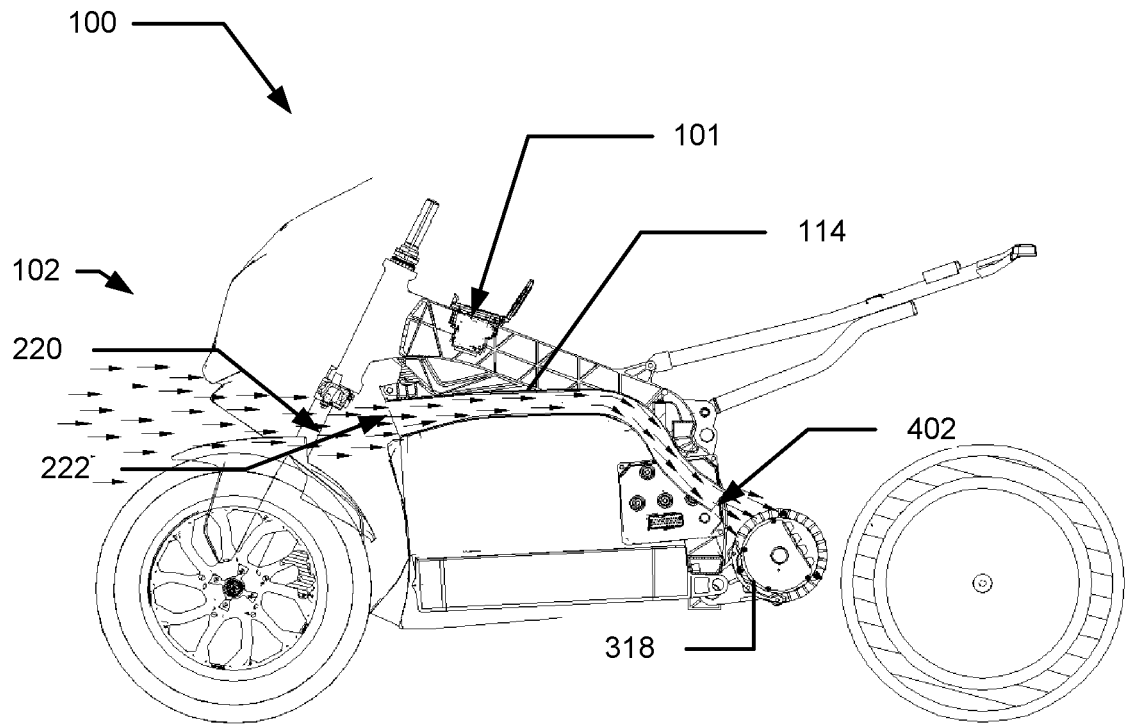
FIG. 4a illustrates a right-side view of an EV, in accordance with an implementation of the present subject matter.

FIG. 4a illustrates a right-side view of the EV 100, in accordance with an implementation of the present subject matter. Here, some of the components, such as the side panel 108, the battery 104, are not shown to clearly illustrate the duct 114.

In an example, the inlet 222 may be positioned at a distance from the gap 220 along the length direction. In some examples, the inlet 222 of the duct 114 may be positioned at the gap 220. Further, the air flowing in the front portion 102 may enter the inlet 222 through the gap 220 and may be supplied to the electric motor 318 through an outlet 402 (hereinafter referred to as "first outlet") facing the electric motor 318. In some examples, depending on a design of the EV 100 and the heat generated by the electric motor 318, the duct 114 may comprise a plurality of outlets facing the electric motor 318 with each outlet to supply air to the electric motor 318.

Figure 4B:
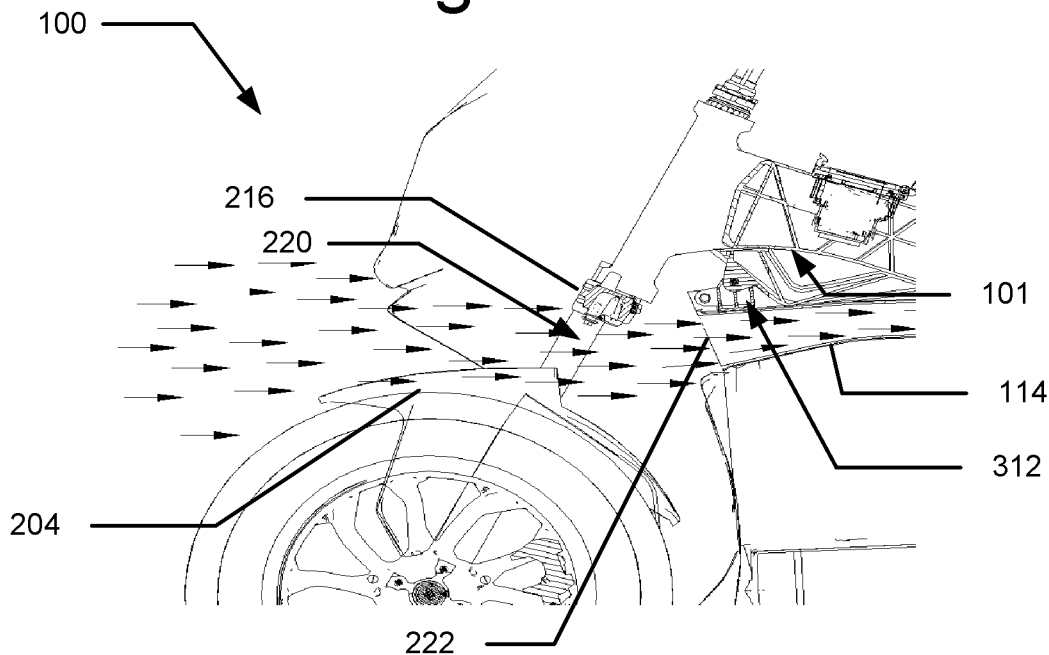
FIG. 4b illustrates an enlarged view of a portion illustrated in FIG. 4a, in accordance with an implementation of the present subject matter.

FIG. 4b illustrates an enlarged view of a portion illustrated in FIG. 4a, in accordance with an implementation of the present subject matter. Here, the entry of air from the front portion 102 into the inlet 222 through the gap 220 is depicted. At the front portion 102, the duct 114 may be coupled rigidly to the frame 101 through the floorboard mount 312.

Figure 5A:
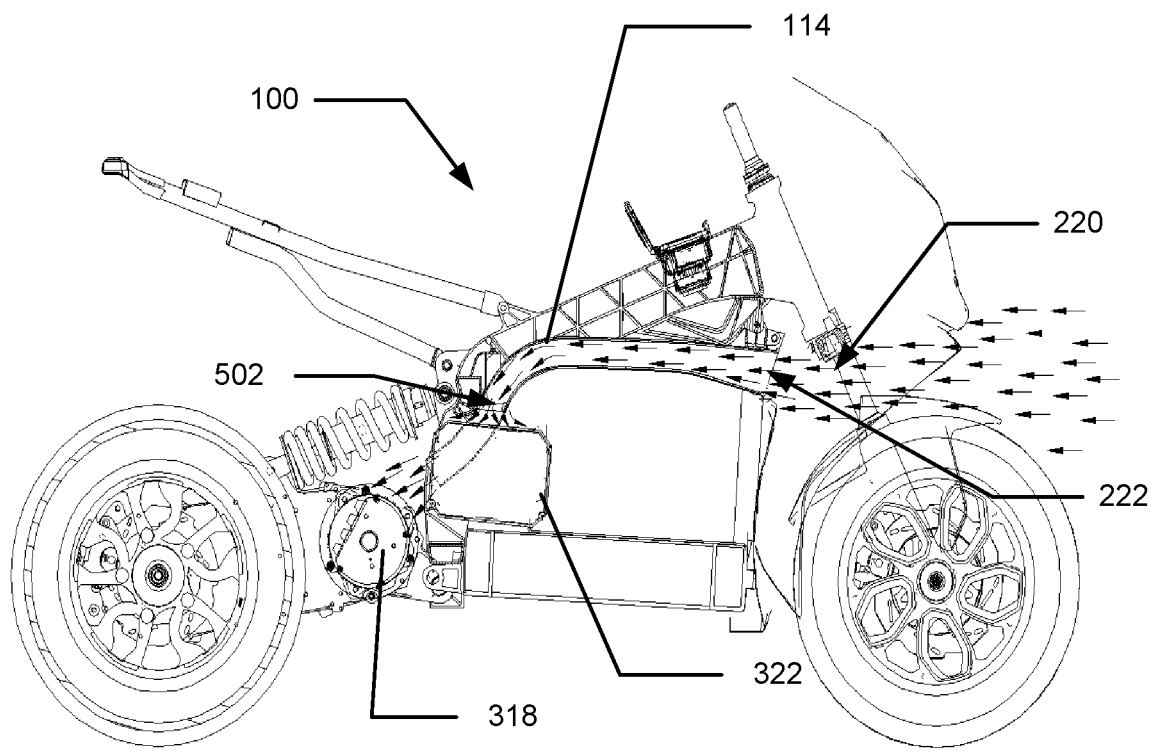
FIG. 5a illustrates a left-side view of an EV, in accordance with an implementation of the present subject matter.

FIG. 5a illustrates a left-side view of the EV 100, in accordance with an implementation of the present subject matter. Here, some of the components, such as the side panel 108, the battery 104, are not shown to clearly illustrate the duct 114.

In an example, in addition to supplying air to the electric motor 318, the duct 114 may supply air to the controller 322 through an outlet 502 (hereinafter referred to as "the second outlet") facing the controller 322. For instance, a portion of air entering the inlet 222 through the gap 220 may be supplied to the electric motor 318 and a remaining portion of air entering the inlet 222 of the duct 114 may be supplied to the controller 322. In some examples, depending on the design of the EV 100 and the heat generated by the controller 322, the duct 114 may comprise a plurality of outlets facing the controller 322 with each outlet to supply air to the controller 322.

In some examples, the duct 114 may supply air to the battery 114 (not shown in FIG. 5a). Accordingly, the duct 114 may comprise one or more outlets facing the battery 104 to supply air to the battery 104 and to prevent the battery 104 from over-heating.

Figure 5B:
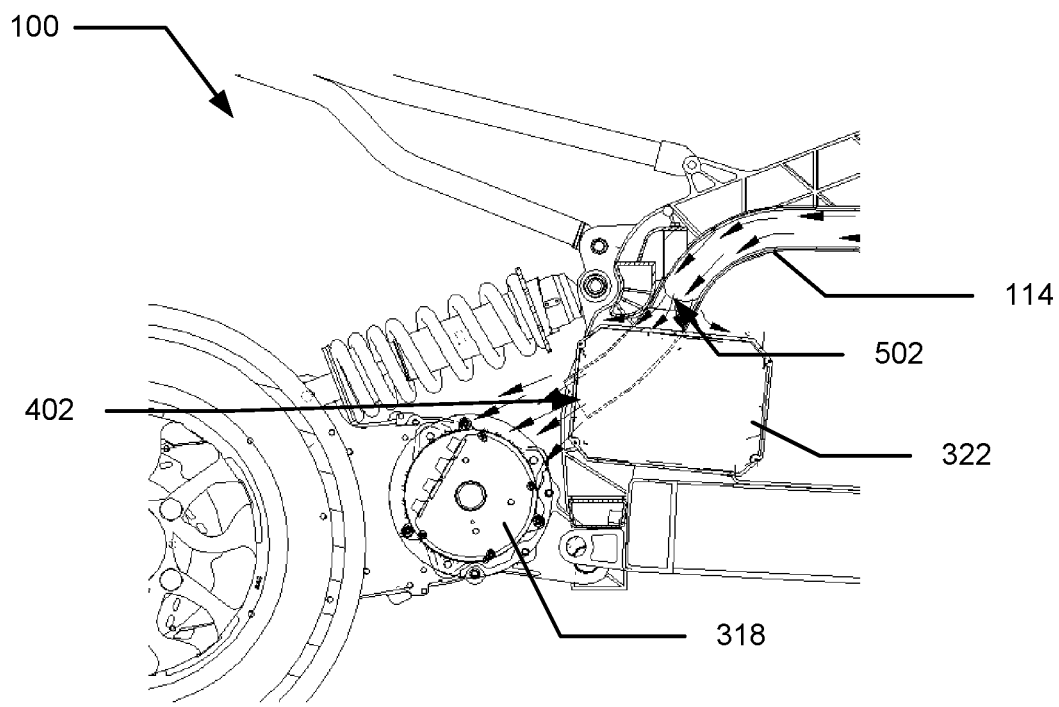
FIG. 5b illustrates an enlarged view of a portion illustrated in FIG. 5a, in accordance with an implementation of the present subject matter.

FIG. 5b illustrates an enlarged view of a portion illustrated in FIG. 5a, in accordance with an implementation of the present subject matter. Here the supply of air entering to the electric motor 318 and to the controller 322 is depicted. A portion of the duct 114 may extend rearwards towards the electric motor 318 and may supply air the electric motor 318 through the first outlet 402. As will be understood, in the view illustrated herein, the portion of the duct 114 may be disposed behind the controller 322. Further, another portion of the duct 114 may extend towards the controller 322 and may supply air to the controller 322 through the second outlet 502.

Figure 6A:
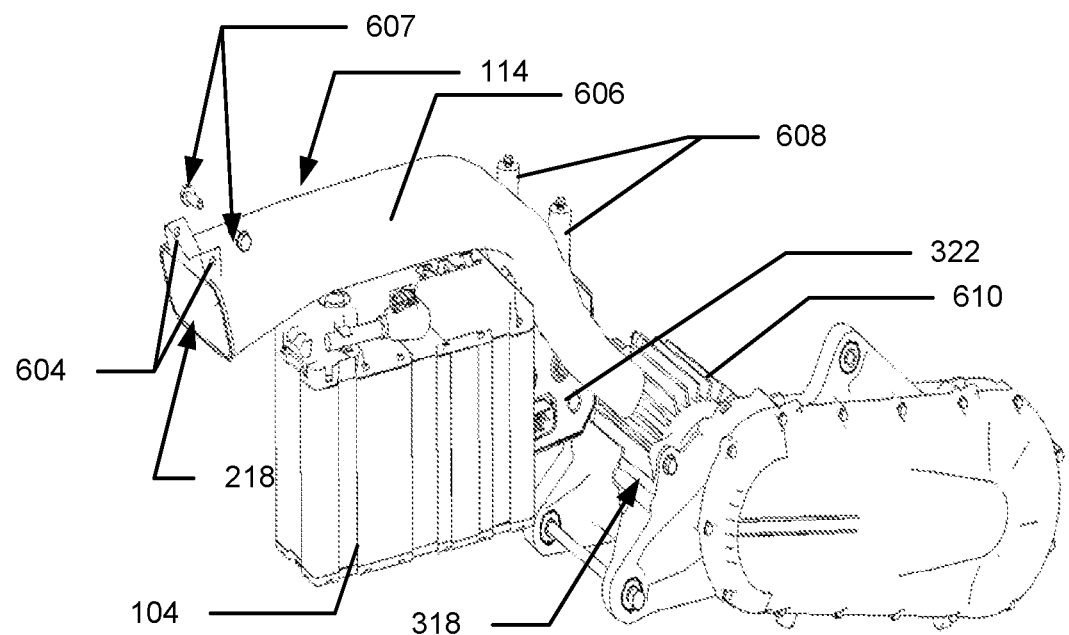
FIG. 6a illustrates a perspective view of a duct facing an electric motor, in accordance with an implementation of the present subject matter.

FIG. 6a illustrates a perspective view of the duct 114 facing the electric motor 318, in accordance with an implementation of the present subject matter.

The shape of the duct 114 may be designed considering the dimensions of components that are mounted on the floorboard structure 310 (not shown in FIG. 6a) and the positioning of the components in the floorboard structure 310. For example, the battery 104 may be placed in the floorboard structure 310 and may occupy a substantial portion of the cavity 316 (not shown in FIG. 6a). Accordingly, the duct 114 may be designed in such a way that the duct 114 passes through a portion reminder of the cavity 316, which is not occupied by the battery 104. For instance, a portion of the duct 114 extending through the cavity 316 may be positioned above all the components mounted on the floorboard structure 310 and occupying in the cavity 316, such as the battery 104, an interface box and the like. Therefore, such components need not be redesigned, i.e., such components may be utilized without any change in dimensions. Also, such components may not have to be positioned differently to accommodate the duct 114 in the cavity 316. Further, upon crossing the components disposed in the cavity 316, the duct 114 may move downwards to face the electric motor 318. For instance, as the duct 114 proceeds to extend rearwards, after passing the edge of the battery 104, the duct 114 may move downwards to face the electric motor 318.

The duct 114 may include a plurality of front mount supports 604 on a top surface 606 of the duct 114. The top surface 606 may be, for example, surface of the duct 114 which is proximate the frame 101 (not shown in FIG. 6a). The front mount supports 604 may facilitate mounting of the duct 114 to the frame 101 at the front portion 102 (not shown in FIG. 6a) by utilizing fasteners 607, such as bolts. Furthermore, at the rear portion 103 (not shown in FIG. 6a), the duct 114 may be mounted to the frame 101 through a plurality of rear mount supports 608, which may be provided on the top surface of the duct 114.

In an example, the electric motor 318 may include a plurality of fins 610. Due to the presence of the fins 610, a surface area of the electric motor 318 increases. This may result in larger amount of heat dissipation from the electric motor 318 in a short time.

Figure 6B:
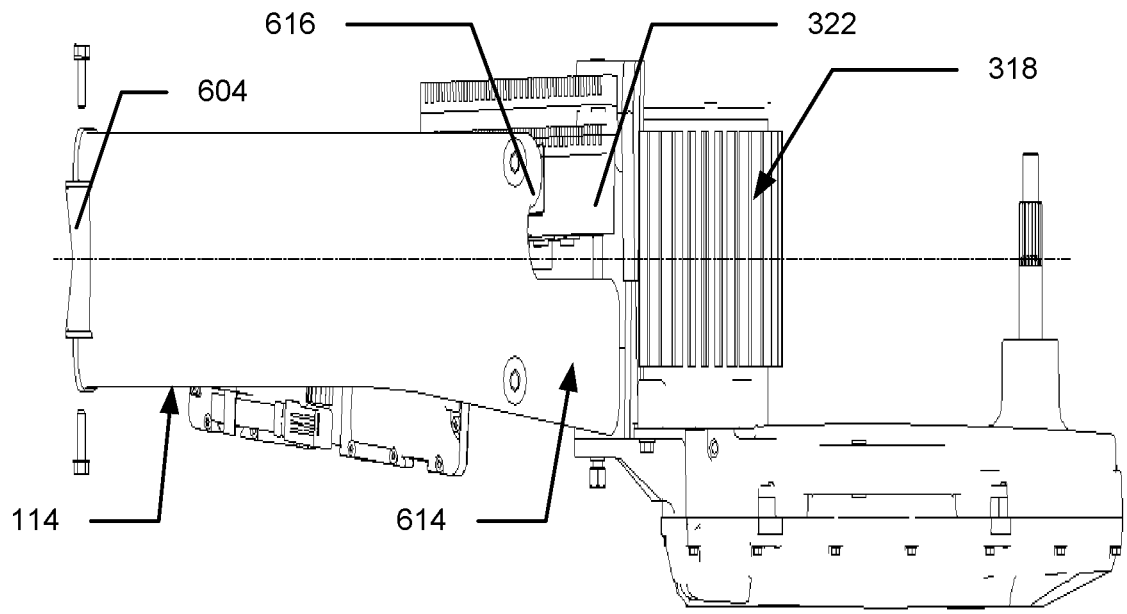
FIG. 6b illustrates a top view of the duct illustrated in FIG. 6a, in accordance with an implementation of the present subject matter.

FIG. 6b illustrates a top view of the duct 114 illustrated in FIG. 6a, in accordance with an implementation of the present subject matter.

In an example, the duct 114 may branch into two, such as a first branch 614 and a second branch 616 as it approaches the rearward direction. For instance, the portion of the duct 114 which may extend towards the electric motor 318 may be referred to as the first branch 614. The first branch 614 may have the first outlet 402 (not shown in FIG. 6b) facing the electric motor 318. The portion of the duct 114 extending towards the controller 322 may be referred to as the second branch 616. The second branch 616 may have the second outlet 502 (not shown in FIG. 6b) that may face the controller 322. In an example, the second branch 616 may be shorter in length than the first branch 614, as the controller 322 is positioned closer to the inlet 222 (not shown in FIG. 6b) when compared to the electric motor 318.

The air entering the inlet 222 may be split and a portion of air may enter the first branch 614 and may be supplied to the electric motor 318 through the first outlet 402. A remaining portion of the air may enter the second branch 616 and may be supplied to the electric motor 318 through the second outlet 502. The relative sizes of the first outlet 402 and the second outlet 502 may be determined based on the amount of heat generated by the electric motor 318 and the controller 322. Since the amount of heat generated by the electric motor 318 is higher than the amount of heat generated by the controller 322, more amount of air may be supplied to the electric motor 318 compared to the controller 322. Accordingly, in an example, the first outlet 402 may be larger in size compared to the second outlet 502.

In an example, the duct 114 may include a plurality of branches and each branch may have an outlet, with each outlet facing each of a plurality of heat-generating components of the EV 100. Accordingly, air from the front portion 102 (not shown in FIG. 6b) of the EV 100 may be supplied to the heat-generating components through an outlet of a branch facing the corresponding heat-generating components. In some examples, each branch of a plurality of branches of the duct 114 may include a plurality of outlets, with each outlet facing a heat-generating component to supply air to the corresponding heat-generating component. Further, in some examples, some or all outlets of each of a plurality of branches of the duct 114 may face a heat-generating component to supply air to the corresponding heat-generating component.

Figure 7A:
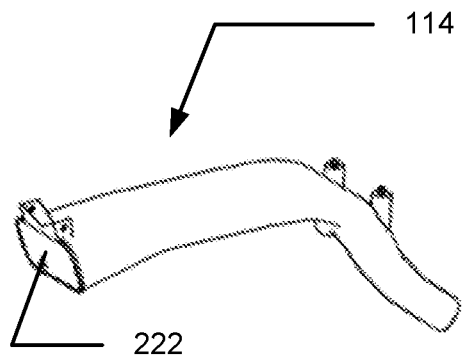
FIG. 7a illustrates a perspective view of a duct, in accordance with an implementation of the present subject matter.

FIG. 7a illustrates a perspective view of the duct 114, in accordance with an implementation of the present subject matter. In an example, the duct 114 may be of rectangular cross-section. The height and the width of the inlet 222 may be selected based on the size of the heat-generating components and the amount of heat that is generated by the heat-generating components.

Figure 7B:
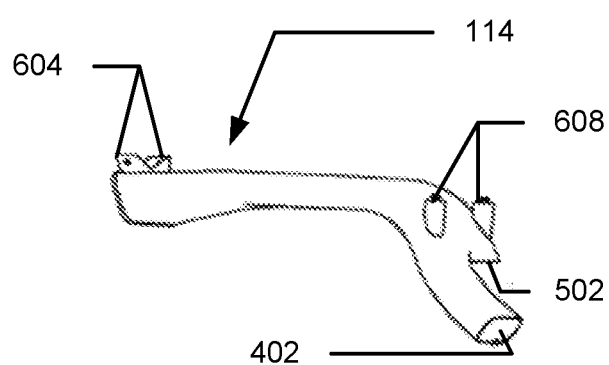
FIG. 7b illustrates a perspective view of a duct, in accordance with an implementation of the present subject matter.

FIG. 7b illustrates a perspective view of the duct 114, in accordance with an implementation of the present subject matter. As mentioned earlier, the duct 114 has the first outlet 402 to supply air to the electric motor 318 (not shown in FIG. 7b) and the second outlet 502 to supply air to the controller 322 (not shown in FIG. 7b).

The duct 114 has the front mount supports 604 to couple the duct 114 to the frame 101 at the front portion 102 (not shown in FIG. 7b) and the rear mount supports 608 to couple the duct 114 to the frame 101 (not shown in FIG. 7b) at the rear portion 103 (not shown in FIG. 7b).

Figure 7C:
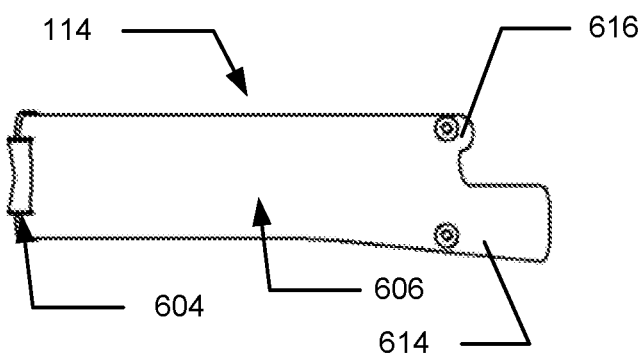
FIG. 7c illustrates a top view of a duct, in accordance with an implementation of the present subject matter.

FIG. 7c illustrates a top view of the duct 114, in accordance with an implementation of the present subject matter. The duct 114 may include the first branch 614 and the second branch 616. The first branch 614 may extend towards the electric motor 318 to supply air to the electric motor 318 (not shown in FIG. 7c) and the second branch 616 may extend towards the controller 322 to supply air to the controller 322 (not shown in FIG. 7c).

Figure 7D:
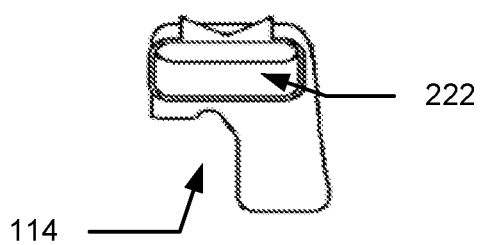
FIG. 7d illustrates a left-side view of a duct, in accordance with an implementation of the present subject matter.

FIG. 7d illustrates a left-side view of the duct 114, in accordance with an implementation of the present subject matter. The height and the width of the inlet 222 of the duct 114 may depend on a distance between the first fork 208 (not shown in FIG. 7d) and the second fork 210 (not shown in FIG. 7d) and the distance between the lower suspension bracket 216 (not shown in FIG. 7d) and the front wheel fender 204 (not shown in FIG. 7d) to maximize the amount of air flow from the front portion 102 (not shown in FIG. 7d) into the inlet 222.

Figure 7E:
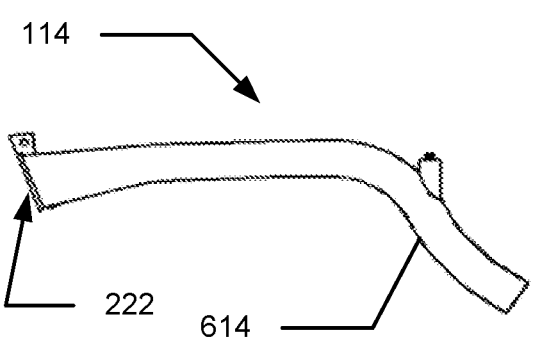
FIG. 7e illustrates a front view of a duct, in accordance with an implementation of the present subject matter.

FIG. 7e illustrates a front view of the duct 114, in accordance with an implementation of the present subject matter. The duct 114 is designed and positioned in such a way that it may avoid interference with components disposed in the cavity 316 (not shown in FIG. 7e). Accordingly, a portion of the duct 114 passing through the cavity 316 may be disposed above the components occupying the cavity 316, such as the battery 104 (not shown in FIG. 7e), the interface box, and the like. Further, upon crossing the components disposed in the cavity 316, the first branch 614 of the duct 114 may move downwards to face the electric motor 318 (not shown in FIG. 7e) and the second branch 616 (not shown in FIG. 7e) may move downwards to face the controller 322. In this regard, the components disposed in the cavity 316 may not have to be redesigned and may not have to be positioned differently to accommodate the duct 114 in the cavity 316.

Figure 7F:
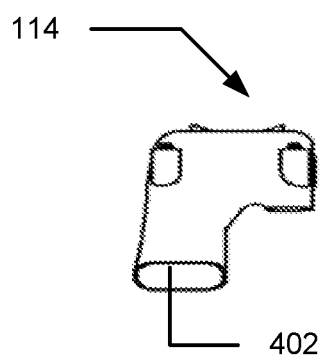
FIG. 7f illustrates a right-side view of a duct, in accordance with an implementation of the present subject matter.

FIG. 7f illustrates a left-side view of the duct 114, in accordance with an implementation of the present subject matter. The first outlet 402 may face the electric motor 318 (not shown in FIG. 7f) to supply air to the electric motor 318. Since the electric motor 318 may generate higher amount of heat than the controller 322 (not shown in FIG. 7f), the amount of air to be supplied to the electric motor 318 is higher. Accordingly, to facilitate higher amount of air supply to the electric motor 318, the dimensions of the first outlet 402 may be higher than dimensions of the second outlet 502 (not shown in FIG. 7f).

Figure 8:
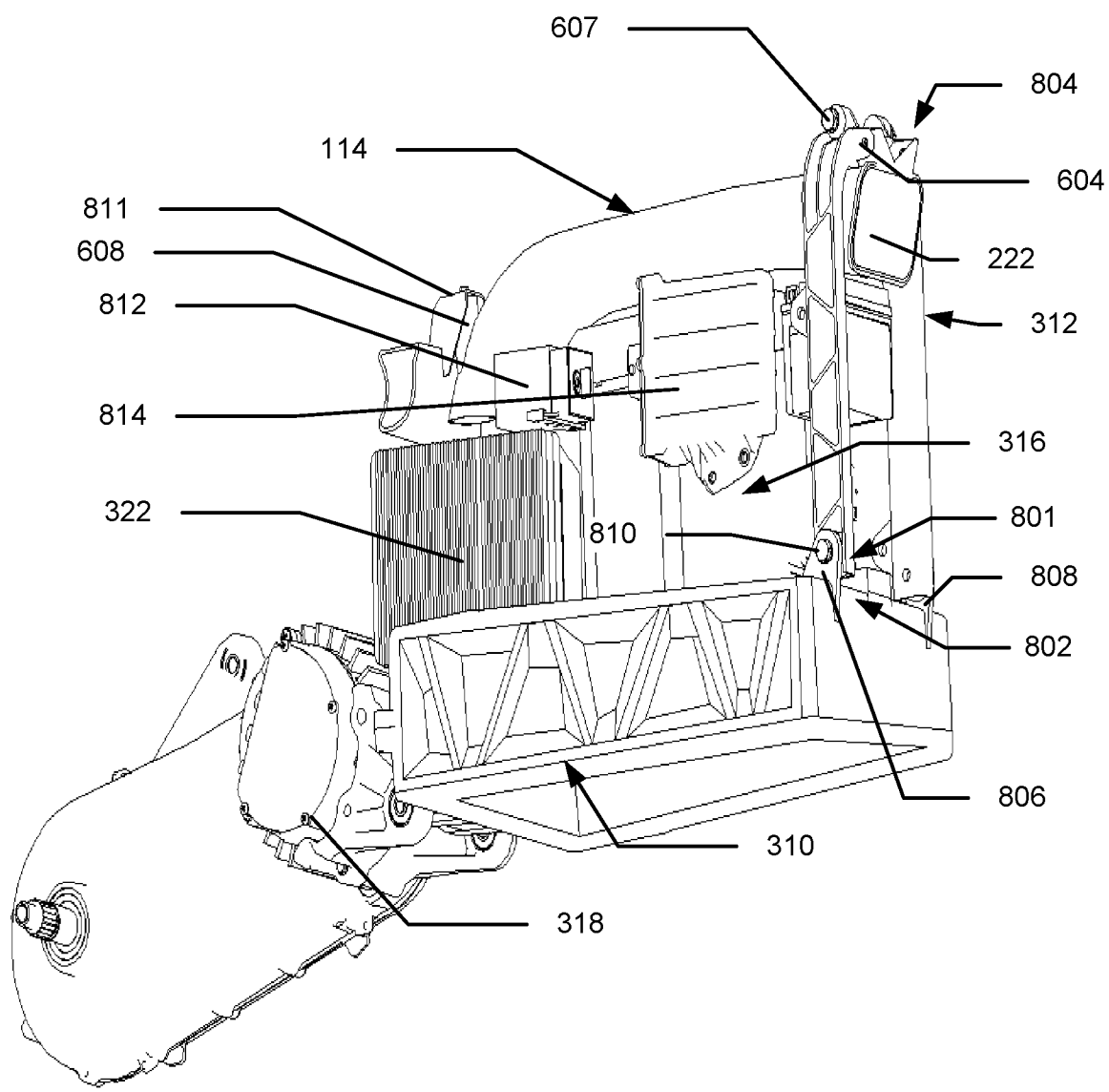
FIG. 8 illustrates a perspective view of coupling of a duct, a floorboard mount, and a floorboard structure, in accordance with an implementation of the present subject matter.

FIG. 8 illustrates a perspective view of coupling of the duct 114, the floorboard mount 312 and the floorboard structure 310, in accordance with an implementation of the present subject matter.

In an example, the floorboard structure 310 may be mounted to the frame 101 (not shown in FIG. 8) via the floorboard mount 312. That is, the floorboard structure 310 may be coupled to the floorboard mount 312 and the floorboard mount 312 may be coupled to the frame 101 (not shown in FIG. 8). For instance, a bottom end 801 of the floorboard mount 312 may be coupled to a top end 802 of the floorboard structure 310 and a top end 804 of the floorboard mount 312 may be coupled to the frame 101. The floorboard mount 312 may be, for example, an inverted U-shape structure. Further, the floorboard structure 310 may be coupled to the floorboard mount 312, for example, through a first bracket 806 and a second bracket 808.

To facilitate mounting of the duct 114 to the frame 101 at the front portion 102 (not shown in FIG. 8), the floorboard mount 312 may be utilized. For instance, the duct 114 may be coupled to the floorboard mount 312. However, in some examples, the duct 114 may be directly coupled to the frame 101.

The duct 114 may be coupled to the floorboard mount 312 by fastening the front mount support 604 to the top end 804 of the floorboard mount 312, such that the inlet 222 may be disposed below the top end 804 of the floorboard mount 312 and inserted into the inverted u-shaped structure and the inlet 222 may face the front portion 102. Accordingly, it may be said that the inlet 222 of the duct 114 is coupled to the top end 804 of floorboard mount 312. Further, the fastening of the front mount support 604 to the floorboard mount 312 may be through fasteners 607, such as a bolt. An inner width of the floorboard mount 312 may be greater than the width of the duct 114 to accommodate the duct 114 in the floorboard mount 312.

In an example, the duct 114 may be coupled to the frame 101 at the rear portion 103 by utilizing the rear mount supports 608. For instance, the rear mount supports 608, may be coupled to a bracket 811 (hereinafter referred to as "the frame bracket") to mount the duct 114 to the frame 101.

Further, as mentioned earlier, the duct 114 is designed in such a way that the duct 114 may avoid interference with the components disposed in the cavity 316 (not shown in FIG. 8), such as the battery 104 (not shown in FIG. 8), a contactor 812, the interface box 814, and the like, which are disposed in the cavity 316.

Figure 9:
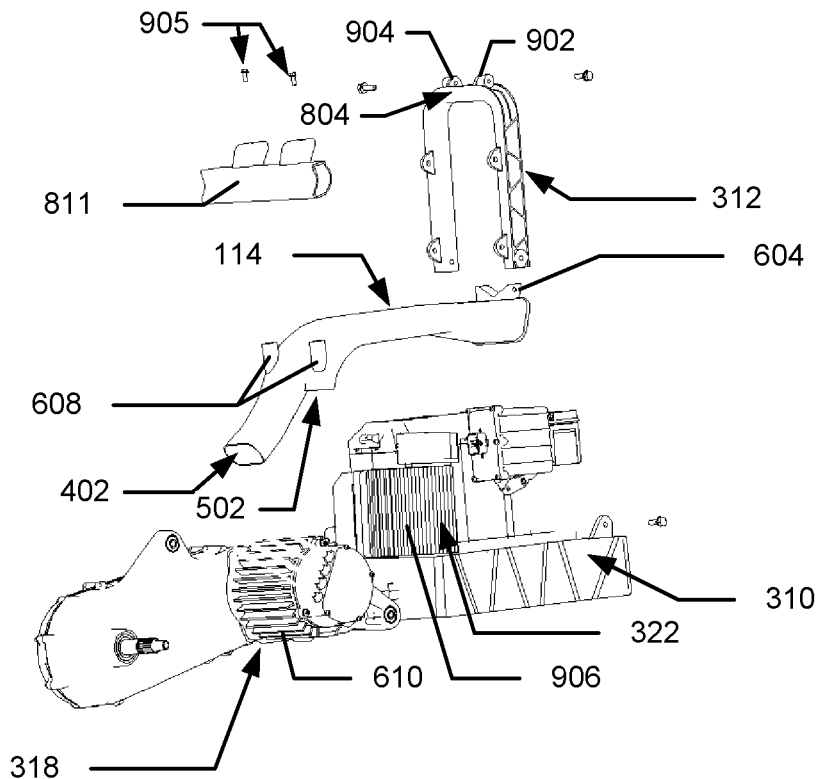
FIG. 9 illustrates an exploded view of coupling of a floorboard mount, a duct and a floorboard structure, in accordance with an implementation of the present subject matter.

FIG. 9 illustrates an exploded view of coupling of the floorboard mount 312, the duct 114 and the floorboard structure 310, in accordance with an implementation of the present subject matter.

To facilitate fastening of the duct 114 with the floorboard mount 312, in an example, the floorboard mount 312 may include a third bracket 902 and a fourth bracket 904 at the top end 804. The front mount supports 604 may be coupled to the third bracket 902 and to the fourth bracket 904. Further, the rear mount supports 608 of the duct 114 may be coupled to the frame bracket 811 to mount the duct 114 to the frame 101 (not shown in FIG. 9). The coupling of the rear mount support 608 with the frame bracket 811 may be through fasteners 905, such as bolts.

Further, as mentioned earlier, the fins 610 of the electric motor 318 may facilitate faster heat dissipation from the electric motor 318. In an example, the fins 610 of the electric motor 318 may be optimized based on airflow from the first outlet 402, such that the rate of heat transfer from the electric motor 318 is increased. For instance, shape of the fins 610 and spacing between adjacent fins 610 may designed based on air flow from the first outlet 402 of the duct 114. Accordingly, the electric motor 318 may, for example, have a plurality of circular fins, a plurality of longitudinal fins or a plurality of circular and longitudinal fins or a spiral fin around a periphery of the electric motor 318.

Similarly, a plurality of fins 906 may be provided on the controller 322 to facilitate faster heat dissipation from the controller 322. Further, the Shape of the fins 906 and spacing between adjacent fins 906 of the controller 322 may depend on the air flow from the second outlet 502. In an example, the fins 906 of the controller 322 may be longitudinal.

Figure 10:
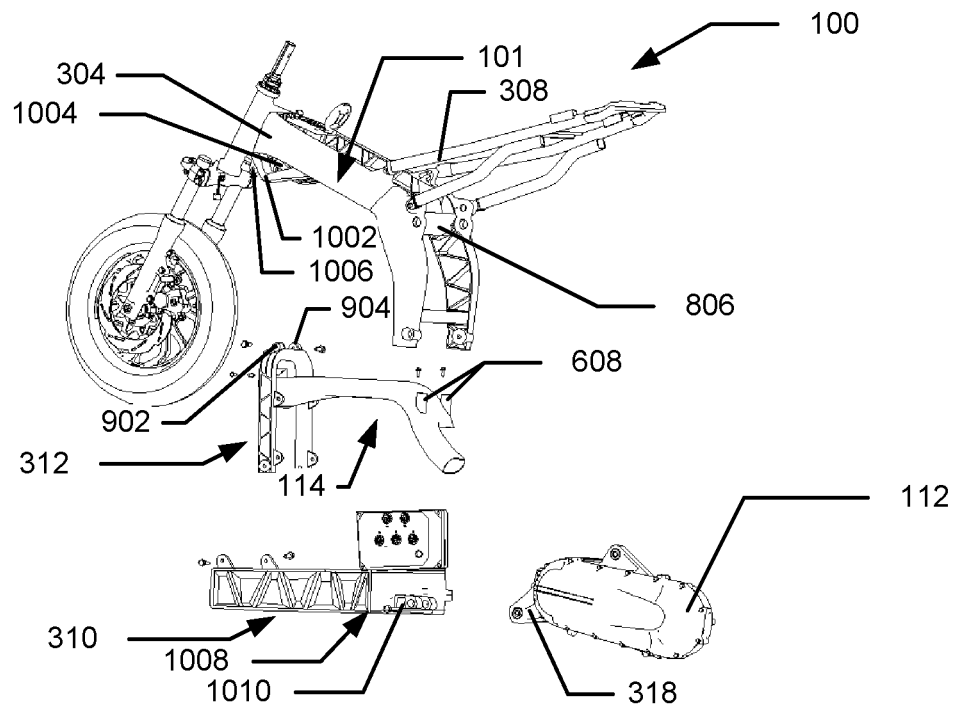
FIG. 10 illustrates an exploded view of a floor board mount, a floorboard structure and a duct from an EV, in accordance with an implementation of the present subject matter.

FIG. 10 illustrates an exploded view of the floorboard mount 312, the floorboard structure 310 and the duct 114 from the EV 100, in accordance with an implementation of the present subject matter.

In an example, to facilitate coupling of the floorboard mount 312 with the frame 101, at the front portion 102 (not shown in FIG. 10), the frame 101 may include a first gusset 1002 on the left-hand side 212 and a second gusset 1004 on the right-hand side 214. The first gusset 1002 and the second gusset 1004 may, for example, be coupled to the first frame member 304 and to the second frame member 306 (not shown in FIG. 10) respectively and may extend rearwards. In some examples, the first gusset 1002 and the second gusset 1004 may be integrated with the first frame member 304 and the second frame member 306. Further, the first gusset 1002 may have a fifth bracket 1006 and the second gusset 1004 may have a sixth bracket (not shown in FIG. 10). The fifth bracket 1006 may be, for example, coupled to the first gusset 1002 or may be integrated with the first gusset 1002. Similarly, the sixth bracket may be, for example, coupled to the second gusset 1004 or may be integrated with the second gusset 1004. The floorboard mount 312 may be coupled to the first gusset 1002 and to the second gusset 1004 to facilitate mounting of the floorboard structure 310 with the frame 101. For instance, the third bracket 902 may be coupled to the fifth bracket 1006 and the fourth bracket 904 may be coupled to the sixth bracket. In some examples, the front mount supports 604 of the duct 114, the third bracket 902, the fourth bracket of the floorboard mount 312 and the fifth bracket 1006 and the sixth bracket may be coupled together. The coupling may be facilitated by fasteners, such as bolts and nuts.

Further, the duct 114 may be mounted to the frame 101 at the rear portion 103 (not shown in FIG. 10) by utilizing the frame bracket 811 (not shown in FIG. 10). For instance, the rear mount supports 608 on the duct 114 may be coupled to the frame bracket 811, which may be coupled to the frame 101. In particular, the frame bracket may be coupled below the third frame member 308.

In an example, the electric motor 318 may be coupled to a rear end 1008 of the floorboard structure 310. Further, the transmission system 112, which may be coupled to the electric motor 318, may include a coupling provision 1010 to couple the transmission system 112 to the frame 101. For instance, the coupling provision 1010 may be coupled to a rear suspension rod (not shown in FIG. 10), which may be coupled to the frame 101 at the rear end 1008 of the floorboard structure 310. This may facilitate the support of the transmission system 112 on the frame 101.

Figure 11A:
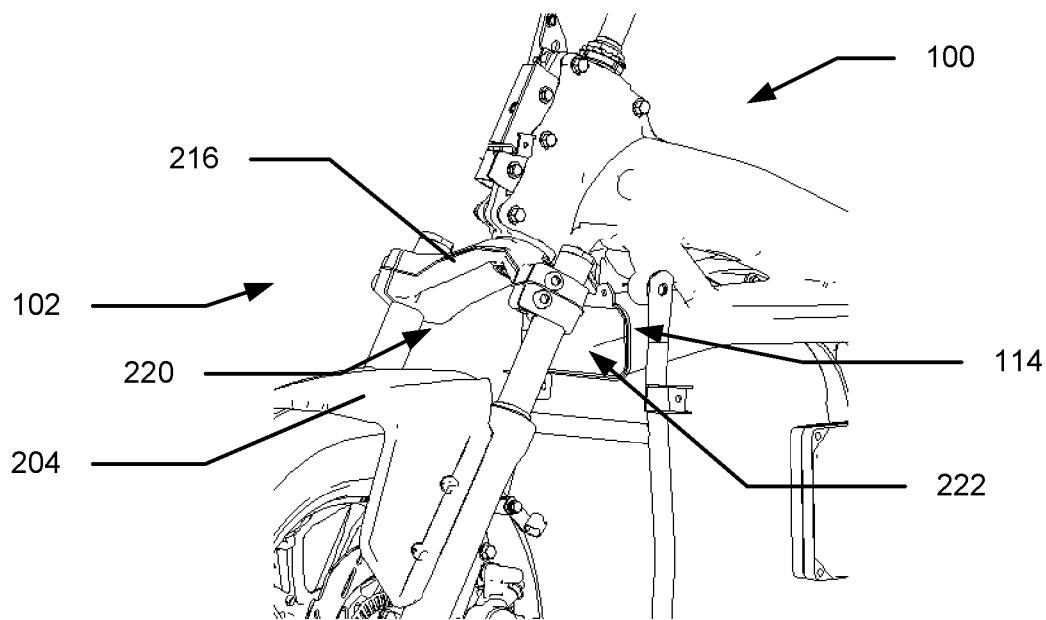
FIG. 11a illustrates a perspective view of an EV, in accordance with an implementation of the present subject matter.

FIG. 11a illustrates a perspective view of the EV 100, in accordance with an implementation of the present subject matter. In an example, the lower suspension bracket 216 may be curved to facilitate obstruction-free air flow. For instance, the lower suspension bracket 216 may be convex-shaped relative to the gap 220. So, the distance between the lower suspension bracket 216 and the front wheel fender 204 may vary along the width direction of the EV 100. As a result, the amount of airflow into the duct 114 may be higher when compared to the scenario where the lower suspension bracket 216 is flat-shaped.

Figure 11B:
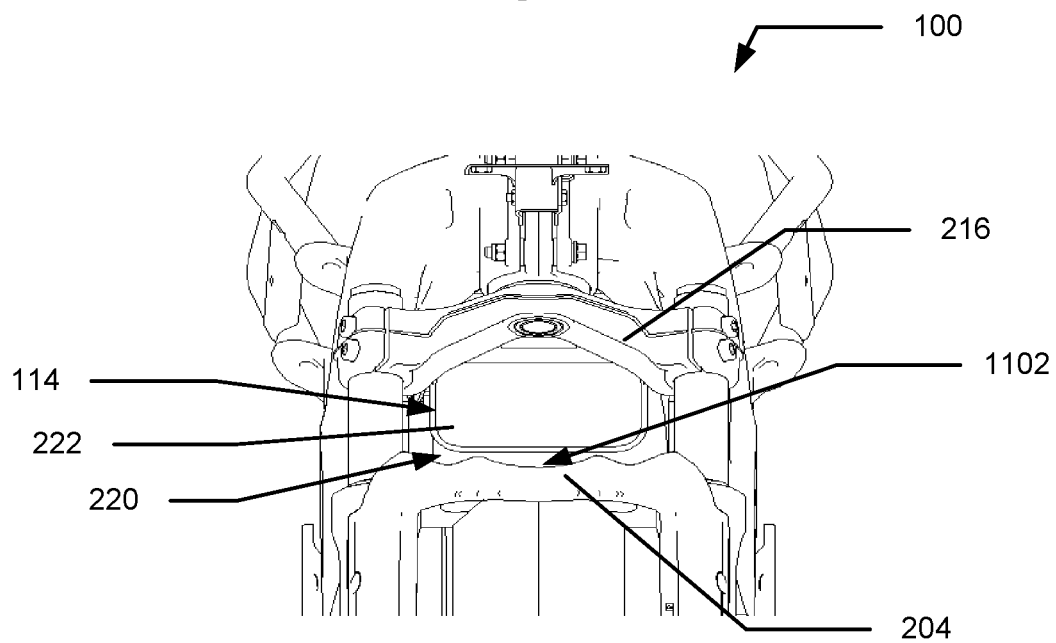
FIG. 11b illustrates a front view of an EV, in accordance with an implementation of the present subject matter.

FIG. 11b illustrates a front view of the EV 100, in accordance with an implementation of the present subject matter. In an example, in addition to the lower suspension bracket 216 being curved, the front wheel fender 204 may be curved. For instance, a top surface 1102 of the front wheel fender 204 may be convex-shaped relative to the gap 220. By virtue of this shape of the front wheel fender 204, the front wheel fender 204 may guide the air flowing in the front portion 102 (not shown in FIG. 11b) into the inlet 222 of the duct 114. As a result, the amount of air flowing into the duct 114 increases when compared to the scenario where the front wheel fender 204 is flat-shaped. Although, in the above example, the front wheel fender 204 is explained as being convex-shaped relative to the gap 220, in some example, the front wheel fender 204 may be concave-shaped relative to the gap 220. In some examples, the lower suspension bracket 216 may be flat-shape and the front wheel fender 204 may be curved.

In the above examples, the electric motor 318 is explained as being open to exposure of air. However, in some examples, the electric motor 318 may be housed in a housing, such as a cowl, as will be explained below.

Figure 12A:
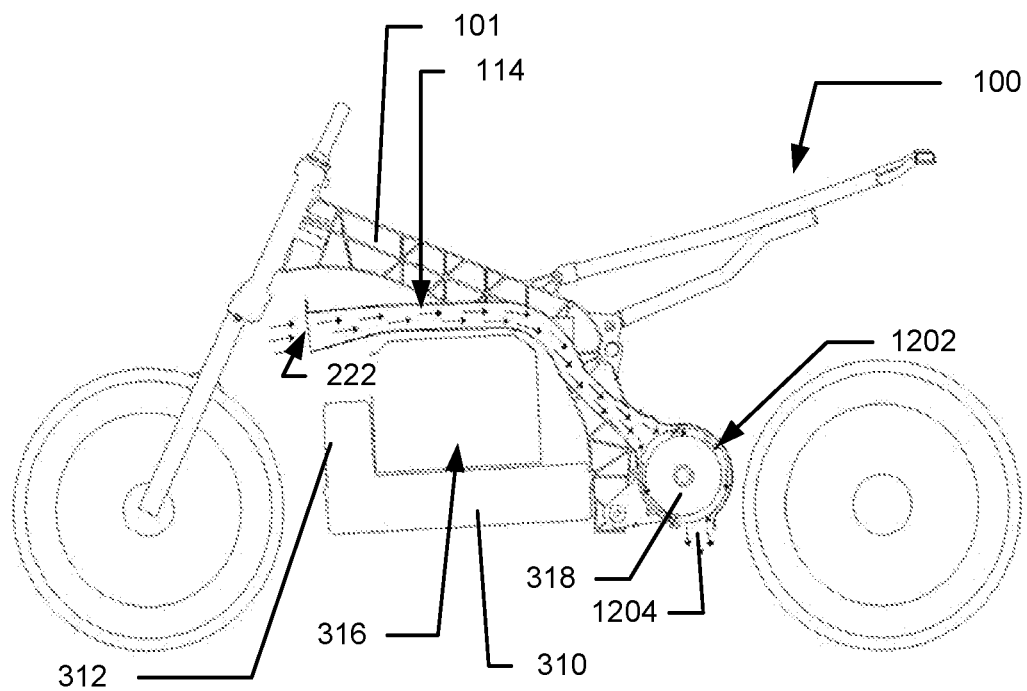
FIG. 12a illustrates a right-side view of an EV, in accordance with an implementation of the present subject matter.

FIG. 12a illustrates a right-side view of the EV 100, in accordance with an implementation of the present subject matter.

The EV 100 may include a cowl 1202, which may surround and house the electric motor 318 to facilitate flow of air around the electric motor 318. The cowl 1202 may be coupled to the duct 114 The cowl 1202 may include an inlet (not shown in FIG. 12a), which may be coupled to the first outlet 402 (not shown in FIG. 12a). Air from the duct 114 may be received at the inlet of the cowl 1202. The cowl 1202 may ensure that the received air is circulated throughout the entire outer surface of the electric motor 318. This may ensure uniform cooling of the electric motor 318. Further, the cooling of the electric motor 318 may be more efficient when compared to the scenario where the electric motor 318 is uncovered. The air, upon getting circulated around the electric motor 318, may exit the cowl 1202 through an outlet 1204 of the cowl 1202.

In some examples, due to movement of the EV 100, the distance between the cowl 1202 and the duct 114 may vary. To ensure the coupling of the cowl and the duct in spite of the variation in the distance, a bellows may be utilized. For instance, the cowl 1202 may be coupled to the duct 114 through the bellows.

Figure 12B:
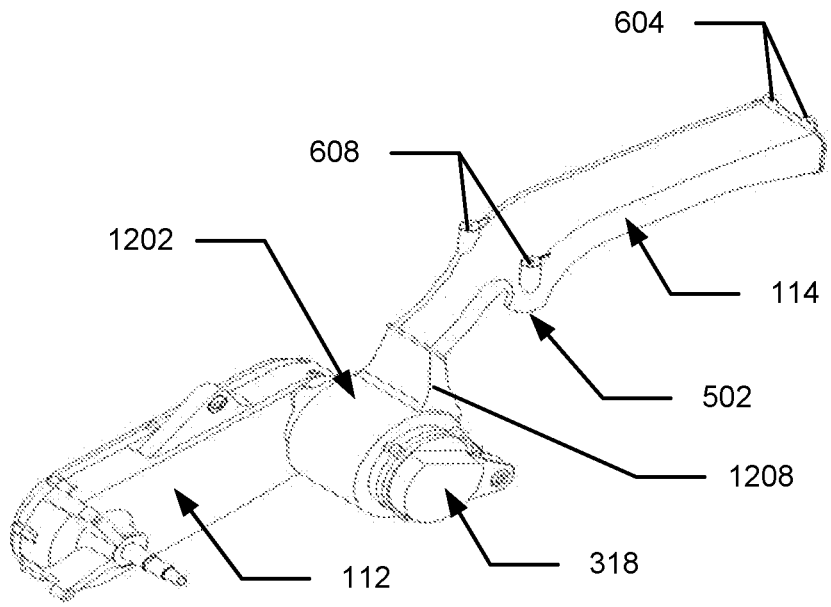
FIG. 12b illustrates a perspective view of coupling of a duct and a cowl of an EV, in accordance with an implementation of the present subject matter.

FIG. 12b illustrates a perspective view of coupling of the duct 114 and the cowl 1202 of the EV 100, in accordance with an implementation of the present subject matter.

The duct 114 may be coupled to the cowl 1202 through a bellows 1208. The duct 114 may be coupled to the bellows 1208 and the bellows 1208 may be coupled to the cowl 1202. Accordingly, the first outlet 402 (not shown in FIG. 12b) of the duct 114 may be coupled to an inlet (not shown in FIG. 12b) of the bellows 1208 and an outlet of the bellows 1208 may be coupled to the inlet (not shown in FIG. 12b) of the cowl 1202.

The bellows 1208 may be a flexible part, which may expand or contract on application of pressure. In an example, the bellows 1208 may expand and contract in response to variation of distance between the duct 114 and the cowl 1202 and thereby, the bellows 1208 may accommodate the motion of the cowl 1202 relative to the duct 114. For instance, the bellows 1208 may expand in response to increase in the distance between the duct 114 and the cowl 1202, and the bellows 1208 may contract in response to shortening of the distance between the duct 114 and the cowl 1202. Accordingly, the bellows 1208 may ensure that the air exiting the first outlet 402 is received at the inlet (not shown in FIG. 12b) of the cowl 1202. For instance, air exiting the first outlet 402 may flow through the bellows 1208 to reach the inlet of the cowl 1202.

Although, in the above example, the bellows 1208 is explained as being coupled to the first outlet 402, in some examples, the bellows 1208 may be coupled to a second outlet 502 of the duct 114.

Figure 12C:
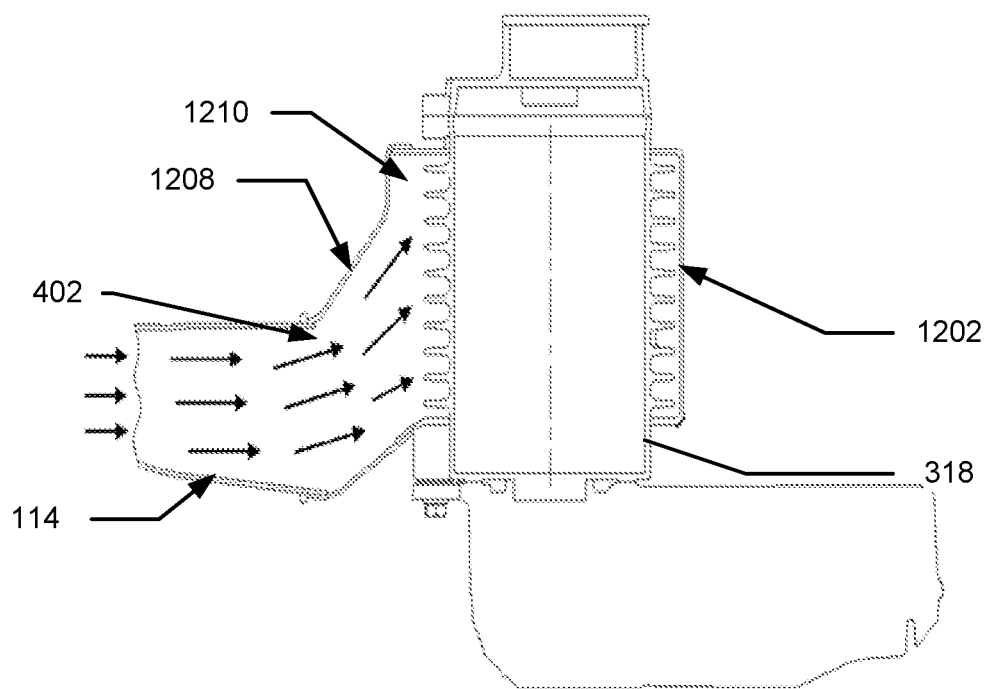
FIG. 12c illustrates a top view of coupling of a duct and a cowl of an EV, in accordance with an implementation of the present subject matter.

FIG. 12c illustrates a top view of coupling of the duct 114 and the cowl 1202 as illustrated in FIG. 12b, in accordance with an implementation of the present subject matter.

In an example, to ensure supply of air from the duct 114 to the cowl 1202. The bellows 1208 may form a snap fit with the inlet 1210 of the cowl 1202 and with the first outlet 402, to ensure that there is no air leakage between the duct 114 and the cowl 1202. As will be understood, in the view depicted herein, the outlet 1206 (not shown in FIG. 12c) of the cowl 1202 is positioned behind the electric motor 318.

Figure 13A:
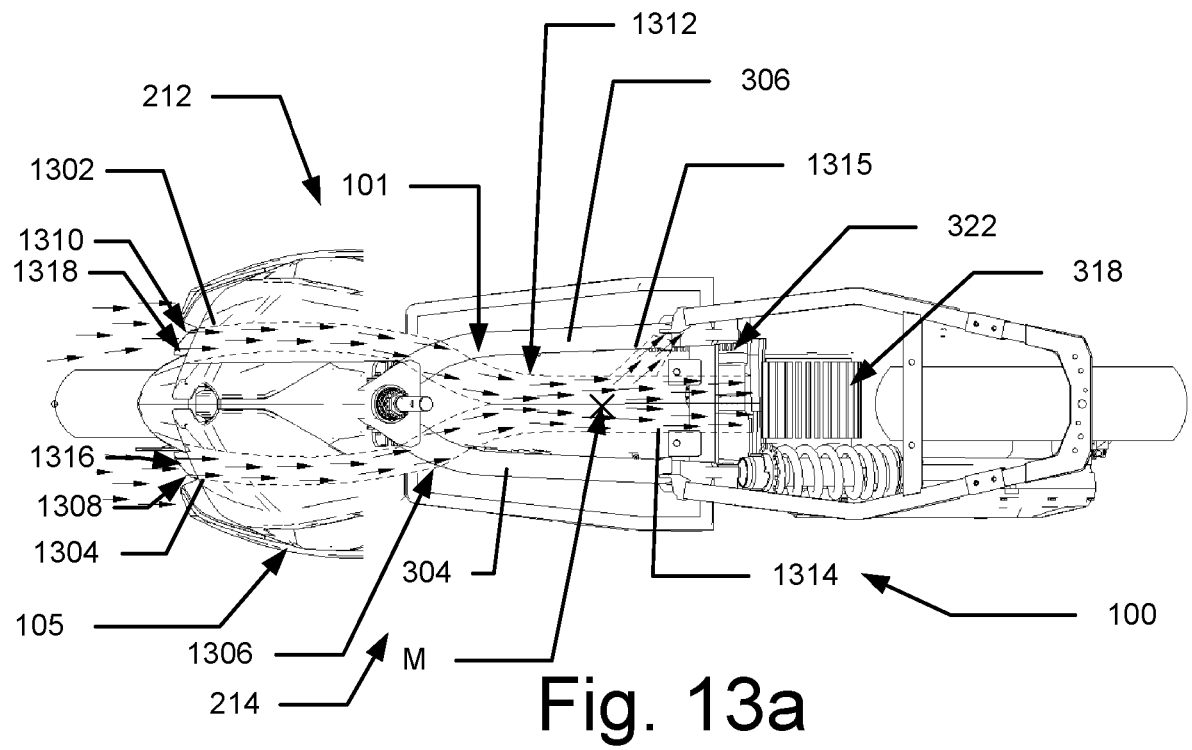
FIG. 13a illustrates a top view of an EV, in accordance with an implementation of the present subject matter.

In the above examples, the duct 114 is explained as having single inlet. In some examples, to increase the amount of air supplied for cooling the electric motor 318 and the controller 322 (not shown in FIG. 12c), the duct 114 may include a plurality of inlets as will be explained below:

FIG. 13a illustrates a top view of the EV 100, according to an example implementation of the present subject matter.

In this example, the air may be received inside the EV 100 by providing openings on the front panel 105. As an example, two openings, such as an opening 1302 (referred to hereinafter as "first opening") on the left-hand side 212 and an opening 1304 (referred to as hereinafter as "second opening") on the right-hand side 214 may be provided on the front panel 105. The right-hand side 214 may alternatively referred as the first side and the left-hand side 212 may be alternatively referred as the second side. Accordingly, the second side is opposite the first side. In an example, the EV 100 may include a duct 1306. To receive the air from the first opening 1302 and the second opening 1304 on the front panel 105, a duct 1306 of the EV 100 may be provided with two front duct members, such as a first front duct member 1308 and a second front duct member 1310. Each front duct member may be positioned in an opening provided on the front panel 105.

The duct 1306 may extend towards the rear portion 103 from the front panel 105 of the EV 100. The first front duct member 1308 may extend rearwards from a front surface 1311 of the front panel 105 on the right-hand side 214 through the first frame member 304 of the frame 101. The second front duct member 1310 may extend rearwards from the front surface 1311 of the front panel 105 on the left-hand side 212 through the second frame member 306. The first front duct member 1308 and the second front duct member 1310 may be, for example, coupled to the front panel 105 or be integrated with the front panel 105.

Further, the duct 1306 may include a rear duct member 1312 may be coupled to and may extend rearwards from the first front duct member 1308 and from the second front duct member 1310. For instance, an inlet (not shown in FIG. 13a) of the rear duct member 1312 may be coupled to an outlet (not shown in FIG. 12a) of the first front duct member 1308 and an outlet (not shown in FIG. 13a) of the second front duct member 1310. Accordingly, to facilitate coupling, the dimensions of the inlet of the rear duct member 1312 may be equal to or greater than a sum of a dimensions of the outlet of the first front duct member 1308 and the outlet of the second front duct member 1310. For instance, a cross-sectional area of the inlet of the rear duct member 1312 may be greater than or equal to sum of a cross-sectional area of the outlet of the first front duct member 1308 and a cross-sectional area of the outlet of the second front duct member 1310.

Similar to the duct 114, the duct 1306 may have a plurality of branches, such as a first branch and a second branch. In an example, the rear duct member 1312, may have the first branch 1314 and the second branch 1315. The first branch may correspond to the first branch 614 and the second branch may correspond to the second branch 616. Accordingly, the first branch 1314 may include a first outlet (not shown in FIG. 13a) to supply air to the electric motor 318 and the second branch 1315 may include a second outlet (not shown in FIG. 13a) to supply air to the controller 322.

Air from the front portion of the EV 100 enters the duct 1306 through an inlet 1316 (hereinafter referred to as "first inlet") of the first front duct member 1308 and an inlet 1318 (hereinafter referred to as "second inlet") of the second front duct member 1310. Further, the air entering through the first inlet 1316 and the second inlet 1318 may be combined together upon entering the rear duct member 1312. Further, the air at the rear duct member 1312 may be supplied to the electric motor 318 through the first outlet and the controller 322 through the second outlet. Accordingly, the heat-generating components may be prevented from over-heating.

Figure 13B:
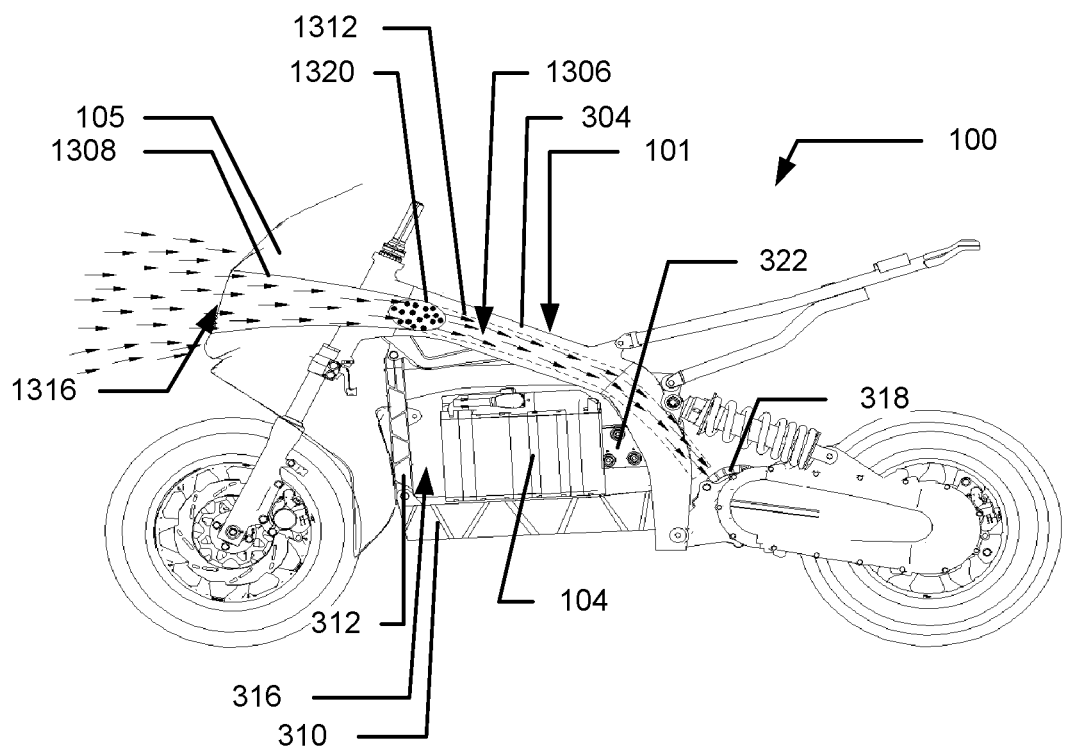
FIG. 13b illustrates a right-side view of an EV, in accordance with an implementation of the present subject matter.

FIG. 13b illustrates a right-side view of the EV 100, in accordance with an implementation of the present subject matter.

In an example the first front duct member 1308 may extend through the first frame member 304 via an opening 1320 provided in the first frame member 304. Similarly, the second front duct member 1310 (not shown in FIG. 13b) may extend through an opening (not shown in FIG. 13b) provided in the second frame member 306 (not shown in FIG. 13b).

Further, due to the positioning of the electric motor 318 and the controller 322, to supply air to the electric motor 318, and the controller 322, the first front duct member 1308, the second front duct member 1310, and the rear duct member 1312 may move downwards as they extend rearwards, such that the air from the duct 1306 is supplied to the electric motor 318 and the controller 322.

Similar to the duct 114, the shape of the duct 1306 may be designed in such a way that the duct 1306 passes through a portion of the cavity 316, which is not occupied by components, such as the battery 104, the interface box, and the like, disposed in the cavity 316. For instance, a portion of the duct 1306 extending through the cavity 316 may be positioned above all the components mounted on the floorboard structure 310 and occupying in the cavity 316. Therefore, the components in the cavity 316 need not be redesigned, i.e., the components may be utilized without any change in dimensions and may not have to be re-positioned in the cavity 316.

With the implementation of the present subject matter, the shape of the duct may be designed considering the dimensions of components that are mounted on the floorboard structure and the positioning of the components, such as the battery, the interface box, and the like, in the floorboard structure. Accordingly, the duct may be designed in such a way that the duct passes through a portion of the cavity, which is not occupied by the components disposed in the cavity. For instance, a portion of the duct extending through the cavity may be positioned above all the components mounted on the floorboard structure and disposed in the cavity. Therefore, in the present subject matter, such components need not be redesigned, i.e., such components may be utilized without any change in dimensions. Also, such components may not have to be positioned differently to accommodate the duct in the cavity.

The present subject matter enables easy and efficient cooling of the heat-generating components, such as an electric motor, a controller and the like in the EV. Further, since the present subject matter utilizes air flowing in the front portion of the EV to cool the heat-generating components, the present subject matter may prevent the utilization of additional power consuming components, such as a cooling fan (which are driven either by the electric motor or consume power from a battery of the EV) for cooling of the electric motor. Accordingly, the present subject matter saves energy. This may result in enhancement in performance of the EV. By preventing the utilization of additional components, such as cooling fans, the present subject matter also prevents noise generated by such components.

Although the present subject matter has been described with reference to specific embodiments, this description is not meant to be construed in a limiting sense. Various modifications of the disclosed embodiments, as well as alternate embodiments of the subject matter, will become apparent to persons skilled in the art upon reference to the description of the subject matter.

We claim:

1. An electric vehicle (EV) comprising:
   a frame extending rearwards from a front portion of the electric vehicle towards a rear portion of the electric vehicle;
   a floorboard structure disposed below the frame and supported by the frame;
   a battery disposed in a cavity defined between the floorboard structure and the frame;
   a first heat-generating component disposed in the rear portion of the electric vehicle;
   a duct having a portion disposed above the battery, wherein the duct extends rearwards from the front portion towards the first heat-generating component to conduct air from the front portion to the first heat-generating component;
   a second heat-generating component disposed in the cavity,
   wherein the duct comprises:
      an inlet facing the front portion to receive air from the front portion;
      a first outlet facing the first heat-generating component to supply air to the first heat-generating component; and
      a second outlet facing the second heat-generating component to supply air to the second heat-generating component, and
   wherein a portion of the duct extends through the cavity, the duct being positioned above components mounted on the floorboard structure and disposed in the cavity.

2. The electric vehicle as claimed in claim 1, comprising:
   a front wheel disposed in the front portion; and
   a front wheel fender disposed above the front wheel, wherein the inlet of the duct is positioned above the front wheel fender, to receive air from the front portion of the electric vehicle.

3. The electric vehicle as claimed in claim 2, comprising:
   a suspension bracket disposed above the front wheel fender, wherein the inlet of the duct faces a gap between the front wheel fender and the suspension bracket.

4. The electric vehicle as claimed in claim 3, wherein the suspension bracket is one of: a convex-shaped and a flat shaped relative to the gap.

5. The electric vehicle as claimed in claim 3, wherein a cross-section of a top surface of the front wheel fender, transverse to a longitudinal axis of the electric vehicle, is one of: a concave-shaped and a convex-shaped, relative to the gap, to guide the air into the duct.

6. The electric vehicle as claimed in claim 1, comprising a front panel disposed at the front portion, wherein the duct comprises:
   a first front duct member extending rearwards from a front surface of the front panel; and
   a rear duct member coupled to the first front duct member and extending rearwards towards the first heat-generating component, wherein the rear duct member comprises the portion of the duct disposed above the battery.

7. The electric vehicle as claimed in claim 6, wherein the first front duct member extends rearwards from the front surface of the front panel on a first side of the electric vehicle, wherein the duct comprises:
   a second front duct member extending rearwards from the front surface of the front panel on a second side of the electric vehicle, the second side being opposite the first side, and wherein the second front duct member is coupled to the rear duct member.

8. The electric vehicle as claimed in claim 7, wherein the rear duct member comprises:
   an inlet coupled to the first front duct member and to the second front duct member; and
   a first outlet facing the first heat-generating component to supply air to the first heat-generating component.

9. The electric vehicle as claimed in claim 7, wherein the rear duct member comprises a second outlet facing a second heat-generating component disposed in the cavity, and wherein the second outlet is to supply air to the second heat-generating component.

10. The electric vehicle as claimed in claim 7, wherein the first front duct member and the second front duct member are integrated with the front panel.

11. The electric vehicle as claimed in claim 1, comprising:
    a cowl surrounding the first heat-generating component, wherein the duct is coupled to the cowl to facilitate flow of air around the first heat-generating component.

12. The electric vehicle as claimed in claim 11, comprising a bellows to prevent leakage of air from the duct to the first heat-generating component by accommodating motion of the cowl relative to the duct, wherein an inlet of the bellows is coupled to the duct and an outlet of the bellows is coupled to the cowl.

13. The electric vehicle as claimed in claim 1, wherein the duct is a load-bearing member.

14. The electric vehicle as claimed in claim 1, comprising:
    a floorboard mount coupled to the floorboard structure and to the frame to facilitate supporting of the floorboard structure by the frame,
    wherein a top end of the floorboard mount is coupled to the frame and a bottom end of the floorboard mount is coupled to the floorboard structure, and
    wherein an inlet of the duct is coupled to the floorboard mount proximate an uppermost portion of the floorboard mount.

* * * * *